United States Patent
Cheng

[19]

[11] Patent Number: 6,039,520
[45] Date of Patent: Mar. 21, 2000

[54] TRUCK BED TIE DOWN ANCHOR CLEAT

[76] Inventor: John C. Cheng, 688 E. Las Flores Dr., Altadena, Calif. 91001

[21] Appl. No.: 09/003,109

[22] Filed: Jan. 6, 1998

[51] Int. Cl.[7] ...................................................... B60P 7/08
[52] U.S. Cl. ........................................... 410/106; 410/110
[58] Field of Search ..................................... 410/101, 102, 410/106, 110, 116; 248/499; 24/265 CD, 115 K

[56] References Cited

U.S. PATENT DOCUMENTS

| | | | |
|---|---|---|---|
| 4,812,093 | 3/1989 | Millar, Jr. | 410/110 |
| 4,818,162 | 4/1989 | Zukowski et al. | 410/116 |
| 5,443,341 | 8/1995 | Hamilton | 410/116 |
| 5,738,471 | 4/1998 | Zentner et al. | 410/110 |
| 5,915,900 | 6/1999 | Boltz | 410/110 |

FOREIGN PATENT DOCUMENTS 607914  11/1960  Canada ................................. 410/110

*Primary Examiner*—Stephen T. Gordon
*Attorney, Agent, or Firm*—Albert O. Cota

[57] ABSTRACT

A truck bed tie down anchor cleat for pickup utility vehicles which includes a clamp bracket (26) in U-shape having a pair of outwardly extending arms (32) to which a pivotal latch plate (52) is securely positioned inbetween. A wedge member (60) is located between the bracket and the truck bed side rail (30) and a rod shaped nut (70) is superimposed on top of the angular shaped wedge member. A bolt (74) is inserted through the bracket and wedge member and tightened into the nut applying a continuous compressive force wedging the cleat between a fulcrum flange (44) integral with the bracket and the side rails holding the invention securely in place with no modification to the truck bed. A second embodiment omits the latch plate and utilizes only one arm (32') in a horizontal position. A third embodiment substitutes a bicycle axle adapter (82) for the latch plate. A fourth embodiment uses a two piece clamp bracket with studs (84) on the bracket face and a detachable clamp bracket (86) held together with hex nuts (90).

13 Claims, 5 Drawing Sheets

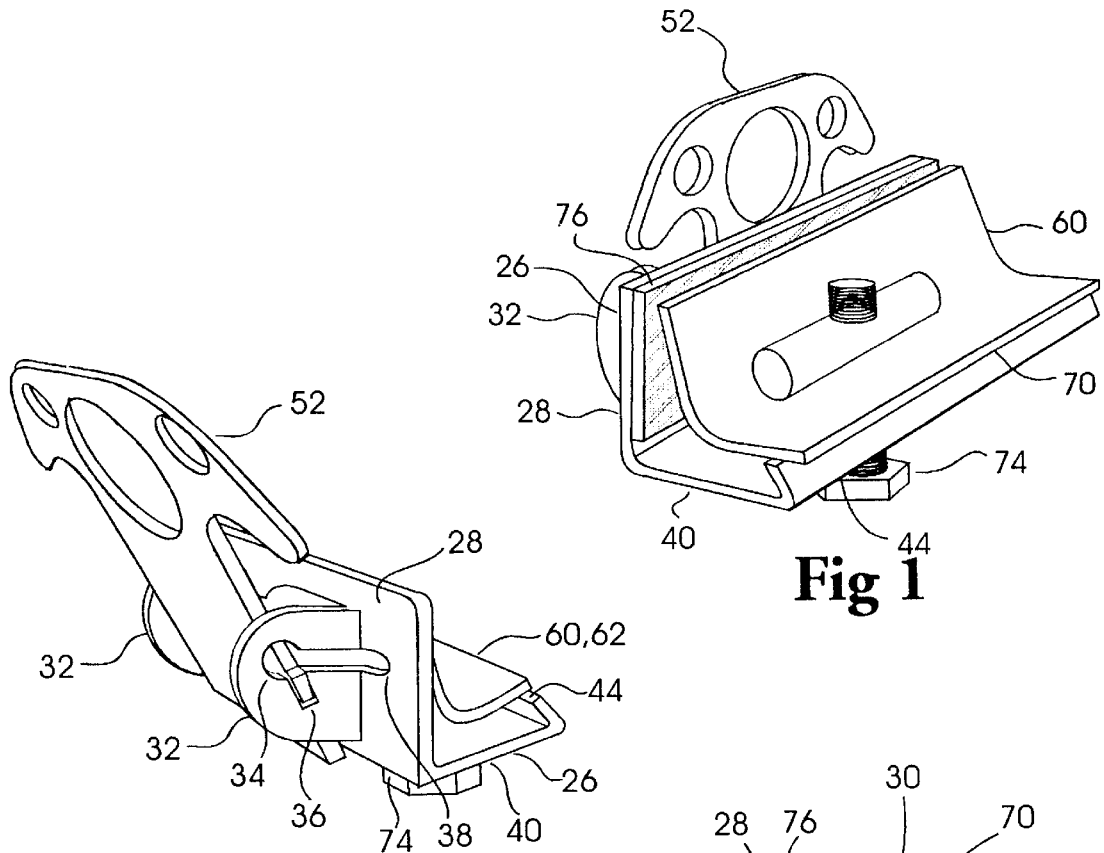

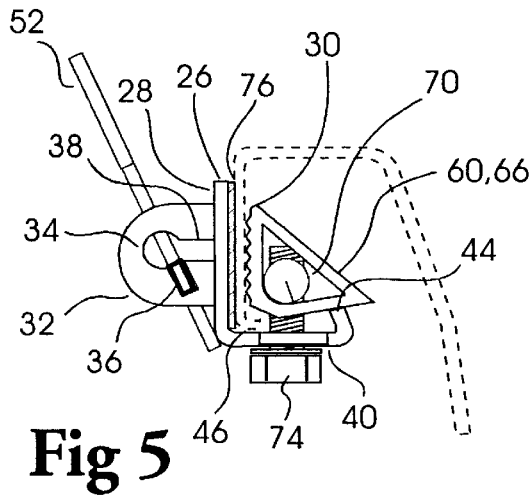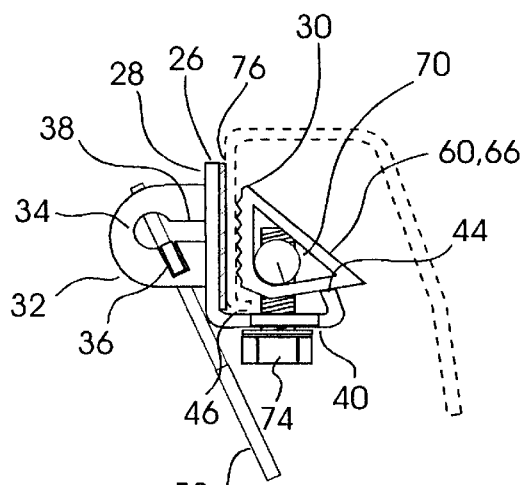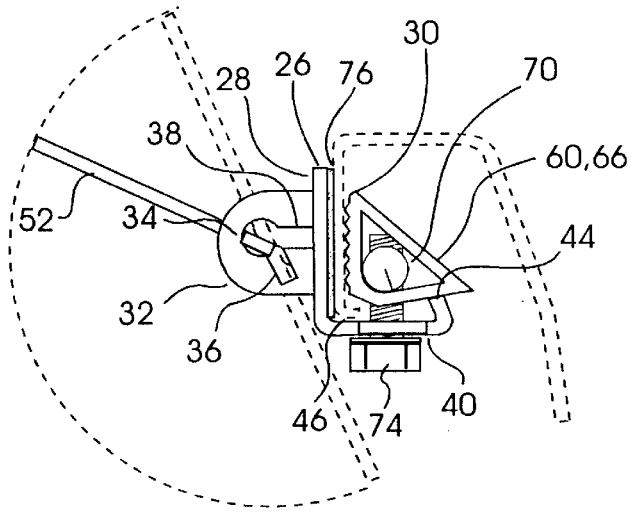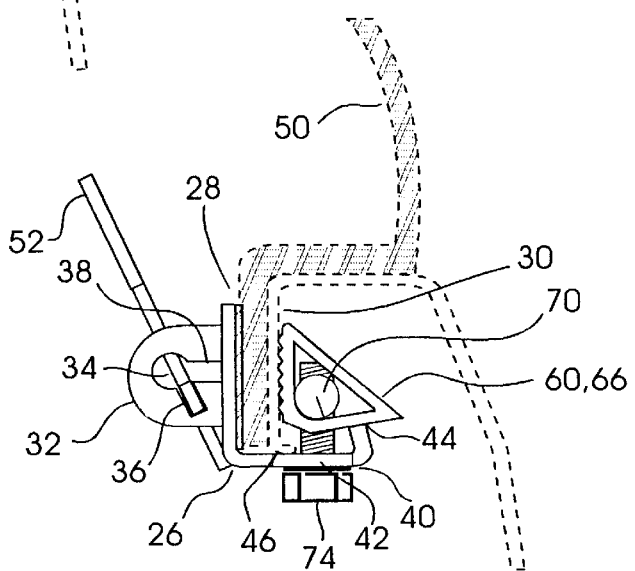

TRUCK BED TIE DOWN ANCHOR CLEAT

TECHNICAL FIELD

The present invention relates to tie down anchors in general more specifically to a anchor cleat removably attached to a truck bed side rail using the wedging action of a U-shaped wedge member upon a fulcrum of a bracket.

BACKGROUND ART

Previously, many types of anchors have been used in endeavoring to provide an effective means for producing a method of tying down articles in the bed of a utility vehicle such as a pickup truck. In most cases this tie down has been limited to a permanently mounted cleat either on the outside of the body or on the inside of the bed side rail other attempts to furnish tie downs without modifying the truck bed usually incorporate devices that fit within the stake hole in the side wall section.

A search of the prior art did not disclose any patents that read directly on the claims of the instant invention, however the following U.S. patents are considered related:

| PAT. NO. | INVENTOR | ISSUED |
|---|---|---|
| 5,273,382 | Yearick | 28 December 1993 |
| 4,979,776 | Schweickert | 25 December 1990 |
| 4,948,311 | St. Pierre, et al | 14 August 1990 |
| 4,762,449 | St. Pierre, et al | 9 August 1988 |
| 4,176,830 | Isley | 4 December 1979 |

Yearick in U.S. Pat. No. 5,273,382 teaches a tie down fitting for a pickup truck stake hole. The fitting includes a double wedge and heads that engage the hole's sides. A threaded fastener lifts the double wedge forcing them against the stake hole sides.

U.S. Pat. No. 4,979,776 of Schweickert is for a tie-down device attached to one piece members for installation on the exterior of a pick-up truck bed. The side and rear members also serve as rail protectors.

St. Pierre, et al in U.S. Pat. No. 4,948,311 disclose a tie down assembly adapted to fit within a pickup truck stake hole. An upper plate engages the upper side of the section and a lower plate is connected by a fastener. Aligned holes in the plates receive a cargo securing line or a fastener projects above the truck bed.

U.S. Pat. No. 4,762,449 also issued to St. Pierre, et al teach an adapter for the same application as above. A cover plate engages the upper side of the stake hole wall section and is secured by a threaded fastener. Aligned slots receive a hook member for pivotal engagement of a cargo line or the like.

U.S. Pat. No. 4,176,830 issued to Isley is for a clamp securing a camper housing and is indicative of the art to which the invention relates.

DISCLOSURE OF THE INVENTION

Since the popularity of pickup trucks in the United States has reached gigantic proportions, the need has prevailed for a method of securing articles stored in its open bed. Many types and shapes of cleats have been permanently attached to the bed body however, this requires modification necessarily drilling holes through the metal body. Others have attempted to fill this need by utilizing the stake hole in the bed originally provided by the manufacturer as previously discussed.

It is therefore a primary object of the invention to provide a tie down anchor cleat that requires no modification or alteration to the vehicle in any manner and yet provides a convenient and stable anchor for cargo securing lines in the form of ropes or straps. The invention utilizes a wedge action between a clamp bracket with a fulcrum leg and a wedge member, in angular shape. A hex bolt comprsesses the wedge member against the truck side rail by the use of the hex head bolt. Since considerable force may be exerted by such a threaded fastener and a resilient pad may be juxtapositioned between the bracket and the bed, the attachment and retention of the invention is well within the strength limitations of the securing lines. It may be seen that the finish of the truck body will not even be marred or disfigured after removal of the device.

An important object of the invention is that the pivotal latch cleat may be located at any convenient angle relative to the cargo being retained. The latch cleat includes a pair of outwardly extending fingers for easy attachment and tying of ropes and openings are provided for hooks on strap ties. Further the entire cleat may be pivoted in the bracket aperture to the exact angle required. There are two positions, substantially up or down that may be maintained by positioning tabs on the cleat into slots in the bracket both stationary positions having considerable strength and robustness.

Another object of the invention is its flexibility in positioning and its ease of relocation. The device requires only tightening one hex head bolt for installation anywhere along the truck side rails at the most convenient location using conventional wrenches or socket sets. Relocation is comparably simple since only loosening and tightening the single bolt is required and positioning under the side rail is intuitively simple.

Still another object of the invention is directed to a second embodiment omitting the latch cleat entirely and utilizing only one outwardly extending arm for attachment purposes. This alternate embodiment is less expensive to manufacture and while not as robust or versatile still creates a convenient hold down anchor utilizing the exact same attachment to the truck body.

Yet another object of the invention in a third embodiment the latch cleat is replaced by a bicycle axle adapter permitting a bicycle to be stored upright in a truck bed transversely by removing the front wheel and locking the fork onto the axle adapter. A number of bicycles may be easily stored side-by-side and since its fork is held rigidly no further tie down is necessary.

A further object of the invention is directed to a fourth embodiment which splits the clamp bracket into two pieces joined together with studs and nuts. The vertical face is duplicated with the removable half containing the extending arms. This embodiment is made to be used when a over the rail bed liner is installed in the pickup truck. Installation is accomplished by drilling clearance holes in the liner for the studs and attaching the bracket vertical face on the inside surface.

These and other objects and advantages of the present invention will become apparent from the subsequent detailed description of the preferred and other embodiment also the appended claims, further, taken in conjunction with the accompanying drawings.

BRIEF DESCRIPTION OF THE DRAWINGS

FIG. 1 is a partial isometric view of the preferred embodiment viewed from the rear.

FIG. 2 is a partial isometric view of the preferred embodiment viewed from the front.

FIG. 3 is a right side view of the preferred embodiment with the latch cleat in the up position.

FIG. 4 is a right side view of the preferred embodiment with the latch cleat in the down position.

FIG. 5 is a right side view of the triangular extrusion embodiment with the latch cleat in the up position.

FIG. 6 is a right side view of the triangular extrusion embodiment with the latch cleat in the down position.

FIG. 7 is a right side view of the triangular extrusion embodiment with the latch cleat shown in its rotatable position.

FIG. 8 is a right side view of the triangular extrusion embodiment, as above, with a camper top installed.

BEST MODE FOR CARRYING OUT THE INVENTION

Figure 9:
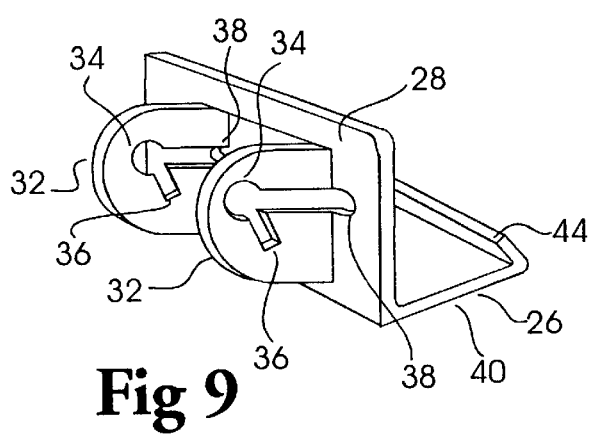
FIG. 9 is a partial isometric view of the clamp bracket completely removed from the invention for clarity.
Figure 10:
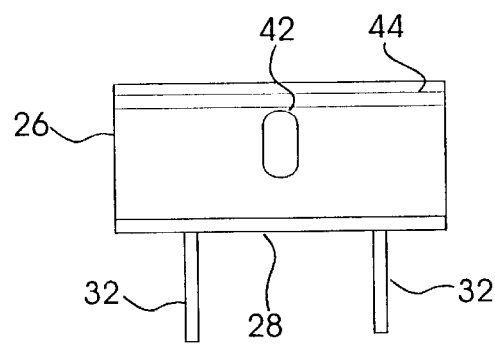
FIG. 10 is a plan view of the clamp bracket completely removed from the invention for clarity.
Figure 11:
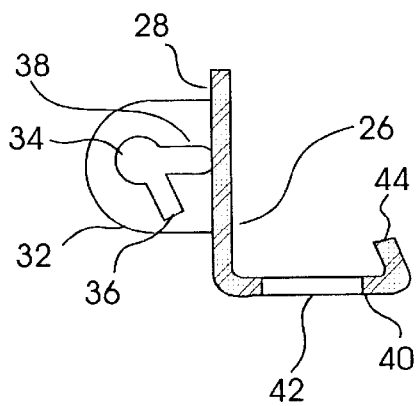
FIG. 11 is a cross sectional view taken along lines 11—11 of FIG. 12.
Figure 12:
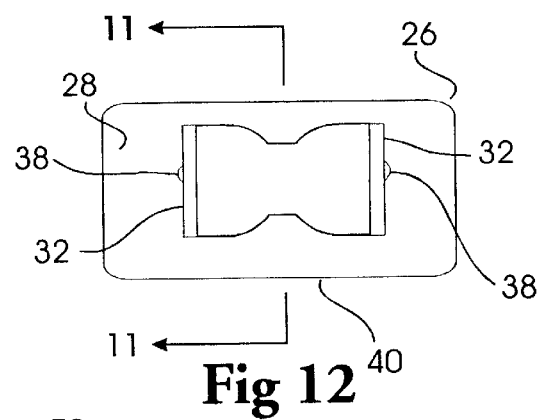
FIG. 12 is a front view of the clamp bracket completely removed from the invention for clarity.
Figure 13:
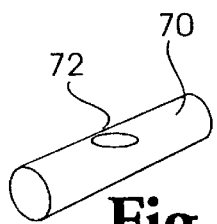
FIG. 13 is a partial isometric view of the rod shaped nut completely removed from the invention for clarity.
Figure 14:
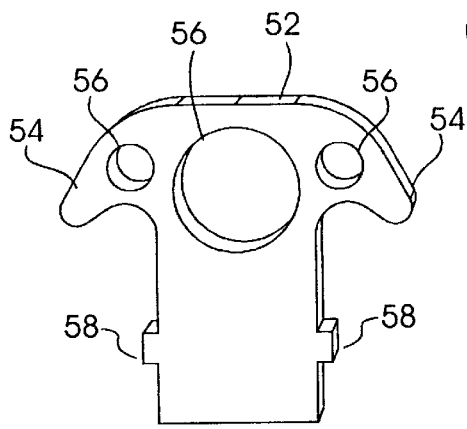
FIG. 14 is a partial isometric view of the latch cleat completely from the invention for clarity.
Figure 15:
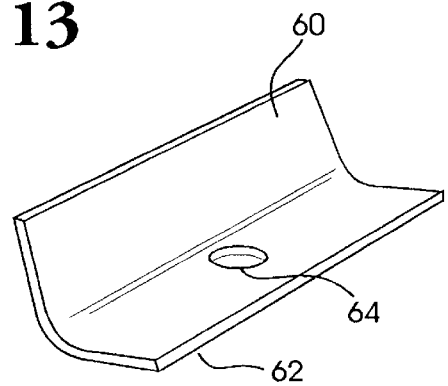
FIG. 15 is a partial isometric view of the wedge member in the radiused angle variation.
Figure 16:
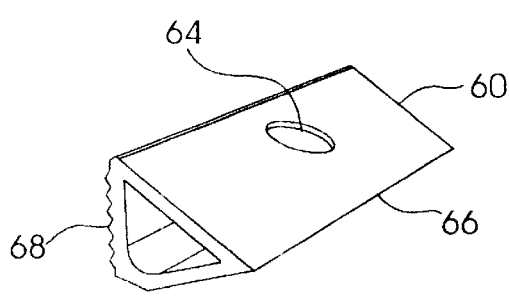
FIG. 16 is a partial isometric view of the wedge member in the triangular extrusion variation.
Figure 17:
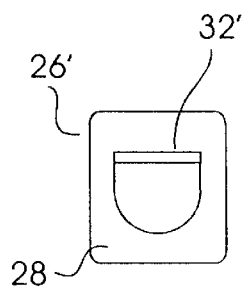
FIG. 17 is a front view of the clamp bracket in the second embodiment completely removed from the invention for clarity.
Figure 18:
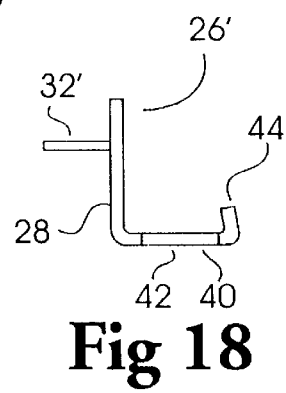
FIG. 18 is a right side view of the clamp bracket in the second embodiment completely removed from the invention for clarity.
Figure 19:
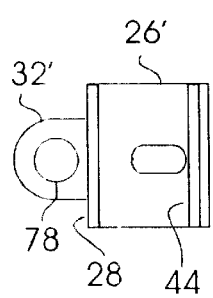
FIG. 19 is a plan view of the clamp bracket in the second embodiment completely removed from the invention for clarity.
Figure 20:
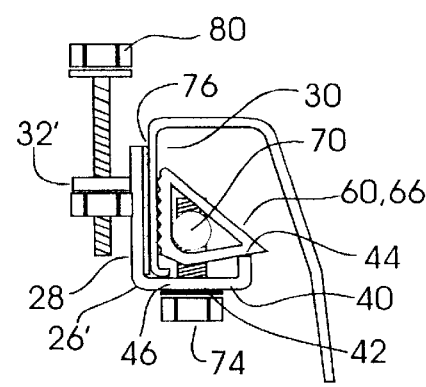
FIG. 20 is a right side view of the clamp bracket in the second embodiment attached to a truck side rail.

The best mode for carrying out the invention is presented in terms of a preferred, second, third and forth embodiment. All of the embodiments are essentially alike particularly the novel wedge action for attachment however, they differ in the configuration and use of the latch cleat.

The preferred embodiment as shown in FIGS. 1 through 16 is comprised of a structural clamp bracket 26 in U-shape with a vertical face 28 equivalent in height to a pickup truck bed side rail 30. The vertical face 28 further contains a pair of outwardly extending arms 32 preferably formed from the parent metal which has been die cut and bent at right angles. While forming the arms 32 is preferable other construction processes may be equally well suited for the application such as separate arms welded to the face 28, angular arms spotwelded, screwed, riveted or any other method of attachment known in the art. The arms 32 each have an aperture 34 with a tab receiving groove 36 therein and an assembly groove 38 continuing from the aperture to the vertical face 28 permitting assembly of the components in the invention. The bracket 26 further includes a bottom 40 having a slot 42 in the center portion and also an inwardly sloping upstanding fulcrum flange 44 opposite the vertical face 28. It should be noted that most pickup truck beds have an inwardly facing flange 46 on the side rail 30 as shown dotted in FIGS. 3–8. The cleat is configured such that the side rail flange 46 does not become an obstruction when the cleat is installed.

A pivoting latch plate 52 is positioned between the outwardly extending arms 32 and is flat in essentially a tee shape with a pair of outwardly extending fingers 54 and a number of openings 56 for wrapping and tying ropes or straps. The plate 52 further includes a pair of opposed outwardly extending tabs 58 to position the plate into the clamp bracket tab receiving grooves 36. This tab and groove arrangement permits positive positioning in the up and down position as shown in FIGS. 3–8 and allows pivoting of the plate within the bracket arms 32, as illustrated in FIG. 7, for optimal angular disposition when tying down articles within the truck bed. The latch plate 52 is depicted by itself in FIG. 14 and is preferably stamped from sheet metal specifically 11 gauge, 0.0119 inch (0.03 cm) thick or any thickness appropriate to the application.

A wedge member 60 is positioned between the clamp bracket 26 and the truck bed side rail 30 as depicted in FIGS. 3–8. The oppossd ends of this wedge member 60 are contiguous with the bracket and rail permitting attachment and removal without alteration of the truck body. This wedge member 60 is presented in two variations. The first variation is illustrated in FIGS. 2–4 and 15 consisting of a radiused structural angle 62 essentially equivalent in length to the clamp bracket 26. The radiused angle 62 contains a hole 64 in one leg for attachment and the angle has sufficient strength to adequately wedge this member 60 between the bracket 26 and the side rail 30 without detrimental or permanent deformation.

The second variation of the wedge member 60 is shown pictorially in FIGS. 5–8 and 16. The length and hold 64 are the same however, it is configured as a hollow triangular extrusion 66. This shape retains the same functional surfaces however, the hypotenuse of the triangle shape adds considerable strength when the ends of the legs are forced together in compression. Aluminum is the preferred material for this member and longitudinal serratures 68 may be added for positive gripping on the leg that is mounted adjacent to the truck side rail 30.

A rod shaped nut 70 is coterminously superimposed in the middle of the wedge member 60 immediately over the hole 64 in a pivotal manner. This nut 70 is illustrated by itself in FIG. 13 and assembled in FIGS. 1, 3–8 and consists of a metallic rod perhaps half of the length of the wedge member 60. The nut 70 contains a threaded hole 72 in the center to receive a tensioning device for assembly and attachment of the invention.

Tensioning means, preferably in the form of a hex head bolt 74, connect the clamp bracket 26 to the nut 70 with the wedge member 60 in between through slot 42 and hole 64. A continuous compressive force is exerted between the nut 70 and bracket 26 drawing the wedge member 60 into intimate contact with the side rail 30 using the clamp bracket fulcrum flange 44 as a fulcrum point therebetween. The nuts 70 pivotability permits considerable variation in wall thickness and shape of the vehicles side rail 30 and inwardly facing flange and still functions properly.

It will be seen from the drawings that the tensioning of the wedge member 60 jams the bracket 26 tightly into the side rail 30 creating more than sufficient strength to equal the capabilities of the rope or strap used for tie down purposes.

A resilient pad 76, essentially the same size as the clamp bracket vertical face 28, is positioned contiguously with the inside edge of the face 28 and compresses against the truck body side rail 30 assuring a positive attachment therebetween. The pad 76 may be made of synthetic rubber or any other resilient compressible material common to this type of application. A camper shell so or fiberglass truck cap may be compressed between the pad 76 and the bracket 26 as illustrated in FIG. 8 if desired.

From the above description it may be clearly seen that the wedging action of the angular shaped member 60 upon the fulcrum flange 44 and side rail 30 offer an extremely robust tie down anchor cleat that is easily installed and removed.

The second embodiment of the invention is illustrated in FIGS. 17–20 and is essentially the same in its wedging action however, the clamp bracket 26' contains only one arm 32' that is positioned horizontally instead of vertically. A single aperture in the arm 32' is in the form of a round cavity 78 without grooves through which a threaded fastener 80, rope or strap may be connected. All of the other elements are the same as the preferred embodiment however, the latch plate 52 is omitted.

Figure 21:
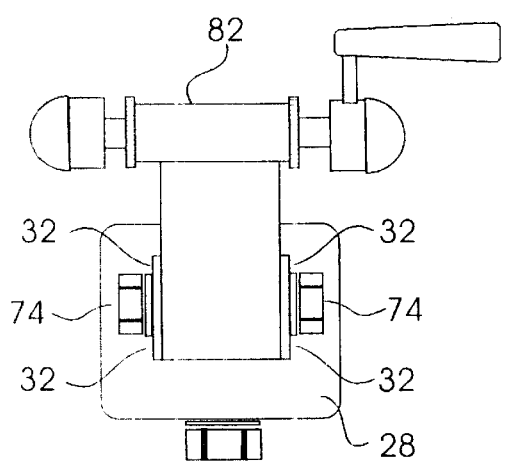
FIG. 21 is a front view of the bicycle axle adapter in the third embodiment.
Figure 22:
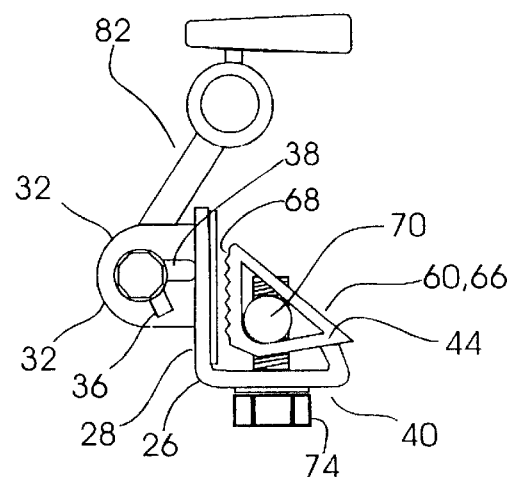
FIG. 22 is a right side view of the bicycle axle adapter in the third embodiment.

The third embodiment is depicted in FIGS. 21 and 22 again utilizing the same basic elements as in the preferred embodiment except the latch plate 52 is replaced by a bicycle axle adapter 82 disposed compressibly between the brackets outwardly extending arms 52. The adapter 82 has an axle the same size and shape as a conventional bicycle axle and a pair of quick release nuts compress the bicycle's forks therebetween permitting a bicycle to be transported within a utility vehicle in an upright position. The adapter 82 may be attached to the clamp bracket arms 32 by an conventional means including, but not limited to, hex head bolts 74 as illustrated.

Figure 23:
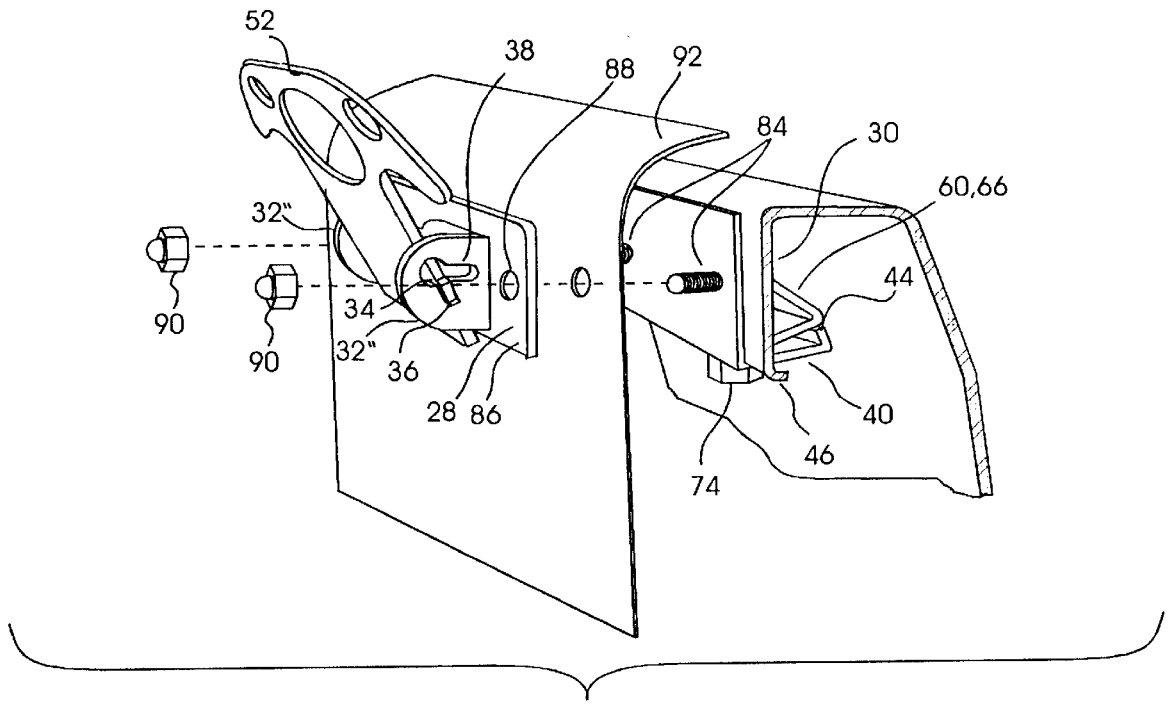
FIG. 23 is an exploded partial isometric view of the fourth embodiment having a detachable latch plate
Figure 24:
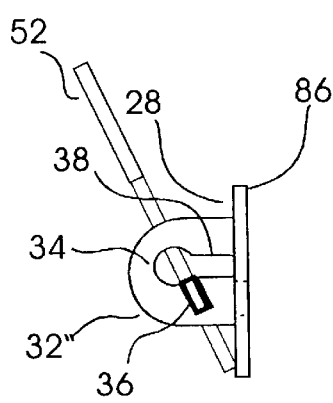
FIG. 24 is a right side view of the detachable latch plate completely removed from the invention for clarity.
Figure 25:
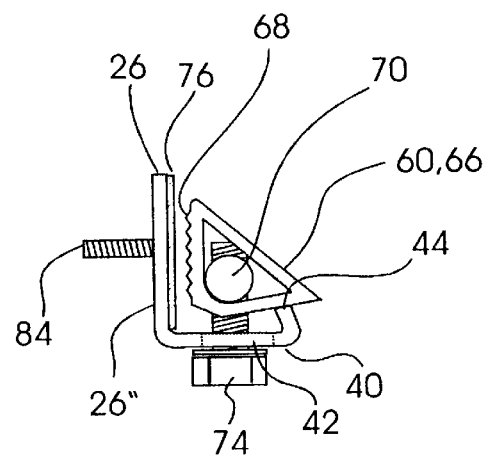
FIG. 25 is a right side view of the structural clamp bracket with studs, triangular wedge member, rod shaped nut and hex nut of the fourth embodiment.

The fourth embodiment is depicted in FIGS. 23–25 differing only in the configuration of the clamp bracket 26. The bracket 26 instead of being one piece is formed in two separate sections. The brackets vertical face 26" is flat and void of arms 32 but includes a plurality of studs 84 protruding at right angles outwardly from the face as shown in FIGS. 23 and 25. A separate detachable clamp bracket 86, shown by itself in FIG. 24, contains the outwardly extending arms 32" and a plurality of bores 88. The latch plate 86 is positioned over the studs 84 and fastened with hexagonal nuts 90 preferably in the form of acorn nuts. The utility for this embodiment allows the use of a "over the rail" bed liner 92 or the like as shown in FIG. 23 as previously discussed.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A truck bed tie down anchor cleat for a utility vehicle having a truck bed with side rails comprising:
   a) a structural clamp bracket essentially in a U-shape with a vertical face equivalent in height to a truck bed side rail and a pair of outwardly extending arms formed from said vertical face,
   b) a pivoting latch plate disposed movably between said outwardly extending arms for tying down objects within the truck bed,
   c) a wedge member contiguously positioned between said clamp bracket and the truck side rail on opposed ends, for removable attachment to the truck body,
   d) a rod shaped nut coterminous and centrally superimposed upon said wedge member in a pivotal manner, and
   e) tensioning means connected to said nut through said clamp bracket such that a continuous compressive force is exerted between the nut and bracket drawing the wedge member into intimate contact with the truck side rail using the clamp bracket as a fulcrum therebetween and said nut's pivotability permitting variation in wall thickness and shape of the truck side rails.

2. The tie down anchor cleat as recited in claim 1 wherein said structural clamp bracket further comprises a bottom having a slot for the tensioning means to penetrate, an inwardly sloping upstanding fulcrum flange opposite the vertical face to permit the wedge member to be drawn angularly into the vehicle bed side rails for attachment and said outwardly extending arms each having an aperture with a tab receiving groove therein for pivotally receiving and retaining the latch plate.

3. The tie down anchor cleat as recited in claim 2 wherein said latch plate is flat and formed in a tee shape with outwardly extending fingers and a plurality of openings for wrapping and tying ropes and straps, further said plate includes a pair of opposed outwardly extending tabs to position the plate into the clamp bracket tab receiving grooves for positive positioning and yet permitting pivoting of the plate within the bracket arms for optimal angular disposition for tying down articles within the truck bed.

4. The tie down anchor cleat as recited in claim 3 wherein said latch plate is stamped from sheet metal.

5. The tie down anchor cleat as recited in claim 1 wherein said wedge member is a radiused structural angle essentially equivalent in length to the clamp bracket, said wedge member further having a hole in one leg of the structural angle such that the tensioning means may pass through and said wedge member further having sufficient structural integrity to withstand adequate tensioning to wedge the member between the clamp bracket and truck side rails without detrimental deformation.

6. The tie down anchor cleat as recited in claim 1 wherein said wedge member is a hollow triangular extrusion essentially equivalent in length as the clamp bracket, said wedge member further having a hole through the triangular extrusion such that the nut may be inserted in the hollow and the tensioning means may pass through and said wedge member having sufficient structural integrity to withstand adequate tensioning to wedge the member between the clamp bracket and truck side rails without detrimental deformation.

7. The tie down anchor cleat as recited in claim 6 wherein said wedge member is extruded aluminum and further contains longitudinal serrations on one leg adjacent to the truck side rail for Positive gripping.

8. The tie down anchor cleat as recited in claim 1 wherein said rod shaped nut further comprises a metallic rod essentially half of the length of the wedge member having a threaded hole centrally located therein.

9. The tie down anchor cleat as recited in claim 1 wherein said tensioning member is a hex head bolt.

10. The tie down anchor cleat as recited in claim 1 further comprising a resilient pad essentially the same size as the clamp bracket vertical face and contiguous therewith for assuring a positive attachment between the cleat and the vehicle bed.

11. A truck bed tie down anchor cleat for a utility vehicle having a truck bed with side rails comprising:
  a) a structural clamp bracket essentially in
  a) U-shape with a vertical face equivalent in height to a truck bed side rail and an outwardly extending horizontal arm formed from said vertical face, having a round cavity therein for tying down objects within the truck bed,
  b) a wedge member contiguously positioned between said clamp bracket and the truck side rail on opposed ends, for removable attachment to the truck body,
  c) a rod shaped nut coterminous and centrally superimposed upon said wedge member in a pivotal manner, and
  d) tensioning means connected to said nut through said clamp bracket such that a continuous compressive force is exerted between the nut and bracket drawing the wedge member into intimate contact with the truck side rail using the clamp bracket as a fulcrum therebetween and said nut's pivotability permitting variation in wall thickness and shape of the truck side rails.

12. The tie down anchor cleat as recited in claim 11 wherein said wedge member is a radiused structural angle essentially equivalent in length to the clamp bracket, said wedge member further having a hole in one leg of the structural angle such that the tensioning means may pass through and said wedge member further having sufficient structural integrity to withstand adequate tensioning to wedge the member between the clamp bracket and truck side rails without detrimental deformation.

13. The tie down anchor cleat as recited in claim 11 wherein said wedge member is a hollow triangular extrusion essentially equivalent in length as the clamp bracket, said wedge member further having a hole through the triangular extrusion such that the nut may be inserted in the hollow and the tensioning means may pass through and said wedge member having sufficient structural integrity to withstand adequate tensioning to wedge the member between the clamp bracket and truck side rails without detrimental deformation.

* * * * *